United States Patent Office 2,786,387
Patented Mar. 26, 1957

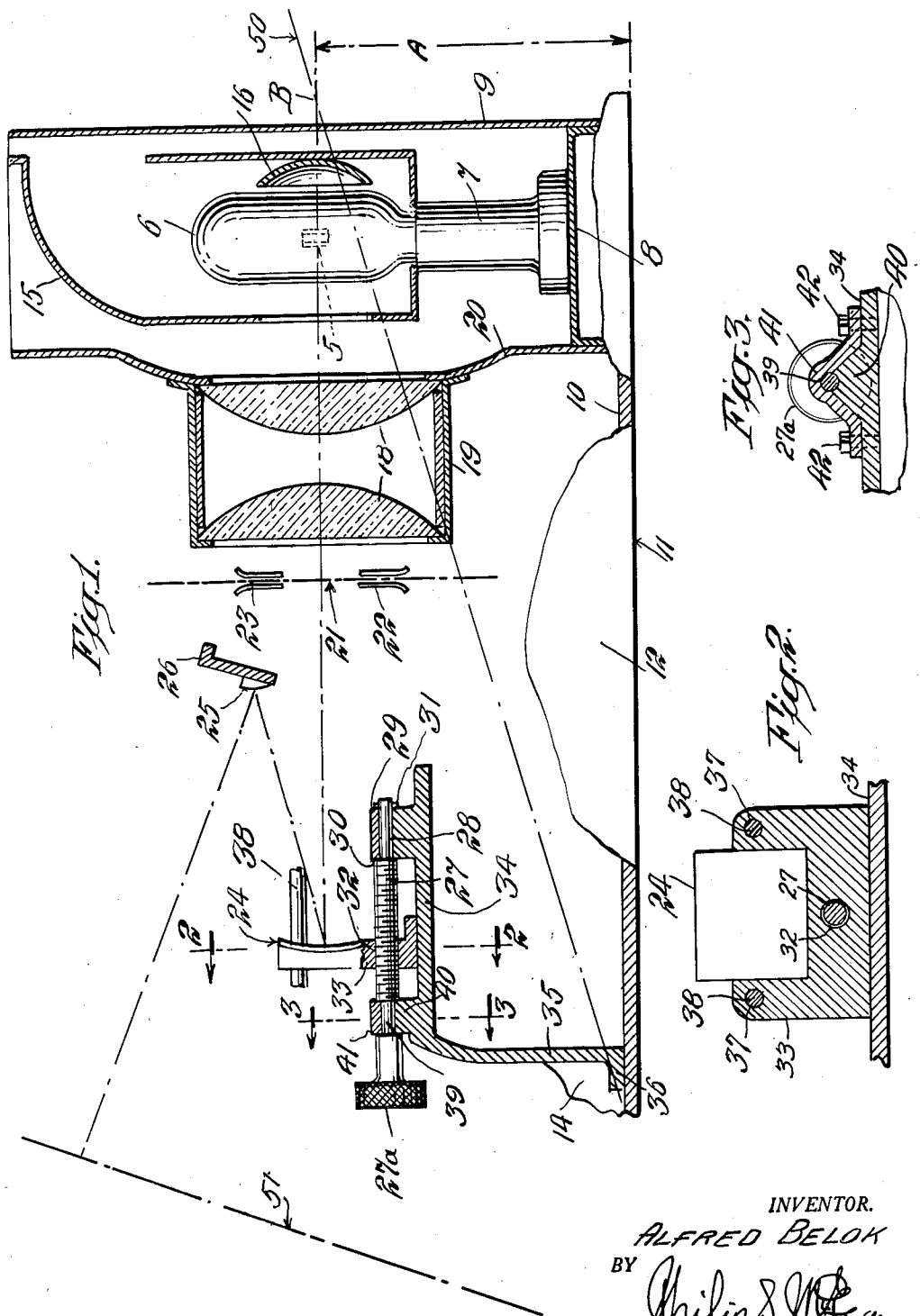

2,786,387

REFLECTING MIRROR OPTICAL PROJECTOR APPARATUS

Alfred Belok, Rockaway Park, N. Y.

Application February 4, 1955, Serial No. 486,104

4 Claims. (Cl. 88—24)

The invention disclosed by this patent application relates to optical projectors, as for use in connection with motion picture film.

Objects of the invention are to provide a compact, light-weight, portable projector having improved means for focus adjustment so that the projected image may be either on a viewing plane self-contained in or at the projecting machine or projected on a distant screen; to provide a projector as above and further improved in that the light source for the projection is a lamp of low wattage, with consequent elimination of any need for a blower or other cooling arrangement; to provide such a projector wherein nevertheless the projected image is very brightly illuminated and very sharp despite the relatively low candle power of the lamp; and to provide such a projector and one wherein the only lenses needed may be condenser lenses of more or less conventional design.

A special feature of invention also is the provision in a projector of an optical system which comprises in combination with said condenser lenses a plurality of mirrors therebeyond, with one of said mirrors a concave or converging mirror and another a convex or diverging mirror.

Another special feature of the invention is that said system is further so arranged, with regard to the relative locations of the light source, any desired transparency (as a picture-carrying frame of a motion picture film), said condenser lenses and said mirrors, that ahead of said mirrors but beyond the condenser lenses, is the projection station for a transparency having a picture the image of which is to be carried by the projection beam, to the viewing plane.

Thus one of the essentials of the invention is the use of the great multiplicity of parallel rays of light emitted from the condenser lenses, in conjunction with the mirrors aforesaid, in such manner that with each of said rays acting illuminatively as would a single such ray or each of the comparatively few thereof passing through a pinhole aperture corresponding to that used in the so-called pinhole or stenoscopic camera, there is obtained a much more highly increased brightness of illumination and a more marked increase in sharpness over the entire projected area than would otherwise be possible with a light source of the low wattage employed while, also, by virtue of said combination of concave and convex mirrors. The large amount of light in the projection beam as said beam is constituted when leaving the condenser lenses is reflected and its brightness maintained throughout to a maximum at the viewing plane.

Other features of the invention, and other desirable objects attained by the invention, are set forth or will appear in the course of the following specification.

The drawing accompanying and forming part of the specification illustrates a practical embodiment of the invention in a now preferred form thereof. Structure, however, may be modified and changed as regards such illustration, all within the true intent and scope of the invention as hereinafter defined and claimed.

Fig. 1 is the drawing is a view partially in side elevation and mainly in vertical section showing said embodiment;

Fig. 2 is a detail transverse vertical sectional view taken on the line 2—2 of Fig. 1; and Fig. 3 is a similar view taken on the line 3—3 of Fig. 1.

In the projector of the invention as illustrated in the drawing, at 5 is shown a light source as in the form of the incandescent filament of an electric light bulb of low wattage, one of such small size, and low cost of operation as, for instance a 50-watt lamp. Said lamp is shown with its base removably held in a suitable socket 7 carried by a support 8 fixed in a lamp housing 9 secured as at its bottom to the floor wall 10 of the projector main casing 11, parts of the two side walls of which are indicated at 12 and 14.

A clear idea of the low weight and small size of the projector as a whole, in the embodiment thereof illustrated in the drawing, will be had if it be noted that the dimension A may be only 2⅞".

At 15 there is shown a hood, desirably of opaque material, for placement as illustrated around the lamp 6, suitable means (not shown) being provided for retaining the hood in the position indicated, this means being of any type which is readily releasable when desired to permit temporary removal of the hood as for replacing the lamp 6 with another when required.

Suitably fixed in the hood 15 is a parabolic reflector 16; and the hood has a circular opening, shown as of the same diameter as the reflector 16. Said opening is diametrically opposite the reflector, and the center lines of the said opening and reflector coincide and are in line with the filament 5, as indicated at B.

Two conventional condenser lenses are shown at 18, 18, these being mounted in a lens case 19 fixed as indicated on a wall 20 forming part of the lamp casing 9. Said lenses are opposite the reflector 16 and axially aligned therewith.

At 21 there is indicated the film gate, that is, the opening or place whereat a picture-carrying frame of the film which is to be projected is to be stationed during projection of an image of said picture, with the film having, for example, a path of travel ahead of and beyond said gate as indicated at 22 and 23.

A concave or converging mirror is shown at 24 and a convex or diverging mirror at 25.

The mirror 25 is shown as fixed on an angle bar 26 suitably anchored at opposite ends in brackets (not shown) carried by the walls 12 and 14 of the main casing.

The mirror 25 is thus fixed, because it is only the concave mirror 24 which is adjusted for focus variation.

Means for thus adjusting mirror 24 is shown as comprising a screw 27 carrying at its outer end an operating knob 27a and at its other end having a reduced cylindrical portion 28 rotatable in a bearing 29 which latter coacts with the shoulder 30 of the screw to prevent endwise movement of the screw in one direction; said portion 28 of the screw having fixed therethrough a pin 31 to prevent endwise movement of the screw in the opposite direction. The thread of the screw is in engagement with a matching thread in an aperture 32 through a holder 33 in which the mirror 24 is seated and suitably secured.

The bottom of the holder 33 is indicated as plane and smooth, for easy slide along the plane and smooth top surface of a horizontal wall 34; this wall shown as carrying the bearing 29 and as offset from an upright member 35 having at its bottom a foot 36 suitably secured to or forming part of the floor wall 10 of the main casing 11. Additional guiding and steadying means for said holder is shown as comprising a pair of apertures 37, 37 through the holder, these apertures parallel one with another, and a pair of parallel rods 38, 38, each slidably engaged by one of the apertures 37, and both suitably anchored at each end by securements not shown.

As will be understood, turning of the knob 27a in one direction effects a focus change relative to the concave mirror 24 by moving said mirror closer to the film gate 21, and turning of said knob in the opposite direction also effects a focus change relative to said mirror by moving the latter farther away from the film gate 21.

For coaction with the parts 28, 29, 30 in permitting easy turn of the screw 26 while holding it against lateral shift and endwise movement, the screw is also shown as having, adjacent to the knob 27a, a reduced cylindrical portion 39, this seated in a bearing the bed of which is at the top of a projection 40 extended upwardly from the wall 34 and the remainder of which is carried by a bearing-cap fitment 41 suitably secured to the wall 34 as indicated at 42, 42. Both bearings for the screw 20 may have removable caps such as indicated in Fig. 3, thus to enable easy assemblage or disconnection of the parts.

The projector as illustrated in the drawing would be especially suitable, keeping in mind the dimension A, for use in connection with a 16 mm. or 35 mm. motion picture film, in which case, as in others where the principles of the invention are used, the viewing screen could be so placed as to give an unusually great enlargement to the projected image without unsatisfactory loss of sharpness, yet with brightness of illumination exhibited all over.

Any standard or other suitable mechanism, as one including feed and take-up reels or spools, the means for rotating the same, film looping and intermittently operating devices, etc., may be incorporated in the projector of the invention; but in order to simplify the drawing, and since the invention is independent thereof and also independent of the selection of any particular means for permitting one film to be substituted for another, or for rewinding a film after it has been advanced to any extent, etc., there has been no attempt to illustrate any of these means in the drawing.

Broadly to summarize the present invention, a projector provided in accordance therewith would comprise, in combination with a low wattage point source of light, means, as the condenser lenses 18, for collecting and enlarging said light at and upon the film gate opening 21 past which the film is transported, a converging mirror 24 in the projector placed and arranged in the path of the beam from said source and condenser lenses so that the image from the film is incident upon said mirror, a diverging mirror 25 in the projector placed and arranged in the path of the rays reflected from the mirror 24, and a viewing screen placed and arranged in the path of the rays reflected from the mirror 25.

Amplification of this summary may be made as follows:

Preferably, if not essentially, the converging mirror 24 is arranged at a distance from the film gate 21 greater than the focal length of said mirror 24, e. g., apparently most desirably one and one-half times said focal length. Thereby, at said mirror 24 there is formed a real, enlarged and inverted image of the film picture. In the art of stenoscopic cameras, it has heretofore been the practice to be careful to position a converging mirror when used so as to space said mirror from the pinhole opening by a distance not exceeding the focal length of the mirror; and all that is obtained here is that there is formed at said mirror a virtual image of the pinhole opening.

Preferably, if not essentially, the axis of the concave mirror 24 is inclined to a line normal to the plane of the film at an angle of from 5° to 10° depending upon the dimensions of the mirrors used. In the case of the projector of the invention, the real image formed by the concave mirror acts as a virtual object for the convex mirror. The convex mirror in turn produces a real image upon a more or less distant screen. The convex mirror, as shown, is positioned with its axis inclined to a line normal to the plane of the film at an angle between 5° and 10°, opposite the inclination of the concave mirror.

In one preferred embodiment of the projector of the invention the concave mirror 24, a spherical mirror, has a radius of curvature of 106 mm. (or a focal length of 53 mm.), and the convex or diverging mirror 25, also a spherical mirror, has a radius of curvature of 265 mm. (or a focal length of 132.5 mm.); that is to say, with the convex mirror 25 having a focal length approximately two and one-half times greater than the focal length of the concave mirror 24.

Again, whereas in the stenoscopic camera, pinhole openings as small as 0.8 mm. are favored, in the case of the projector of the invention the entire area of the picture on the film to be projected (as a full frame of a 16 mm. film, or a single or double frame of a 35 mm. film) is exposed under bright illumination all over to the converging concave mirror 24.

Finally, contrary to the recommended practice in stenoscopic cameras, a feature of the invention is also the smallness of the convex mirror relative to the size of the concave mirror. As an example, with the concave mirror 24 shaped or masked to have an effective reflecting area of 1¾" x 1⅜" (and having, say, a radius of curvature of 4¼"), the convex mirror (having, say, a radius of curvature of 10½") would probably most desirably be shaped or masked to have an effective reflecting area of 1" x ¾"; which is to say, with an area of approximately 2 square inches for the mirror 24, the area of the mirror 25 would be only about ¾ square inch. If spherical aberration is indicated as some distortion at the top of the projected image, this may be overcome and eliminated by tilting the projector up at an angle such as indicated at 50 or by tilting the top of the screen forwardly at an angle such as indicated at 51, about 18° to the horizontal and vertical, respectively.

To provide the comparatively small size convex mirror 25, it has been found practical to form the same as half the segment of an arcuate section of a cylinder, this section being taken on a chord intersecting the ends of the arc and the half then being taken on a radius of the cylinder intersecting the center of the chord and arc.

What is claimed is:

1. An optical projector comprising a light source and condenser for concentrating light on subject matter to be projected, a film gate including a projection aperture positioned in front of said light source and condenser for supporting transparent subject matter to be projected at said projection aperture, a slightly inclined spherical concave mirror positioned in front of said film gate and in axial optical alignment with said light source and projection aperture to reflect collected light rays in an inclined path in the direction of said film gate, an inclined convex mirror facing and positioned rearwardly of said concave mirror and in axial optical alignment therewith, the optical axis between the concave mirror and convex mirror being at an acute angle to the projection axis whereby the projection beam is reflected from the concave mirror to the convex mirror where the beam is received and projected to a screen positioned beyond the concave mirror, and means for adjusting the concave mirror along the axis of optical alignment toward and away from the projection aperture and in respect to the convex mirror for focusing the optical image collected by the concave mirror on the convex mirror to thereby present a sharply defined image substantially free of spherical and chromatic aberrations at the screen.

2. An optical projector in accordance with claim 1 wherein the convex mirror is positioned intermediate and above the concave mirror and the projection aperture.

3. An optical projector in accordance with claim 1 wherein the concave mirror has a reflecting area greater than the reflecting area of the convex mirror by at least twice, said convex mirror having a focal length at least substantially 50% greater than the focal length of the concave mirror.

4. An optical projector in accordance with claim 1 wherein the concave mirror has its axis inclined to a line normal to the plane of the film gate at an angle between about 5° and about 10°.

References Cited in the file of this patent

UNITED STATES PATENTS

| | | |
|---|---|---|
| 1,053,650 | Saalburg | Feb. 18, 1913 |
| 1,669,027 | Seymour | May 8, 1928 |
| 1,699,689 | Curry | Jan. 22, 1929 |
| 1,785,347 | Herrschaft | Dec. 16, 1930 |
| 2,198,014 | Ott | Apr. 23, 1940 |
| 2,306,679 | Warmisham | Dec. 29, 1942 |
| 2,490,052 | Harris | Dec. 6, 1949 |
| 2,520,634 | Grey | Aug. 29, 1950 |
| 2,531,783 | Mosca | Nov. 28, 1950 |
| 2,697,379 | Walker | Dec. 21, 1954 |